Figure 2:
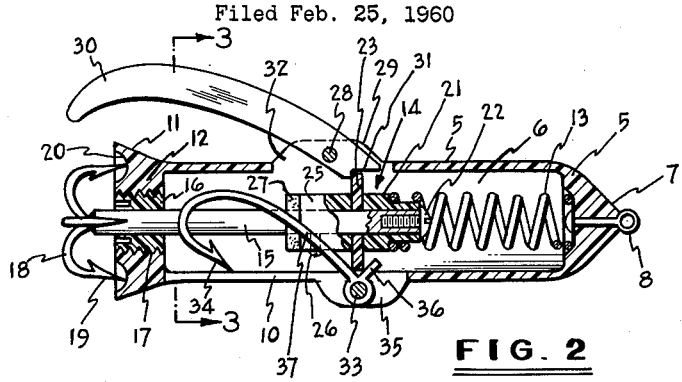

Jan. 30, 1962

M. T. ANDERSON 3,018,582

FISHING LURE

Filed Feb. 25, 1960

INVENTOR.
Martin T. Anderson
BY
*James H. Gyles*
Attorney

United States Patent Office 3,018,582
Patented Jan. 30, 1962

3,018,582
FISHING LURE
Martin T. Anderson, Spring St., Hope Valley, R.I.
Filed Feb. 25, 1960, Ser. No. 11,004
1 Claim. (Cl. 43—35)

This invention relates to a fishing lure of the type generally recognized as a plug and wherein the plug embodies a plurality of hook devices that are normally retracted so as to avoid any objectionable projections that would tend to hook into weeds or other sub-surface obstructions.

The invention contemplates a lure having a plurality of hook devices and a trigger mechanism upon which the fish will initially bite to release the hooks quickly and to embed the hooks into the mouth of the fish.

The invention contemplates a lure having a body portion that is generally cylindrical and a gang hook that is projected rearwardly when released by the biting action of the fish and with the movement of the gang hooks and the mechanism associated therewith simultaneously projecting laterally disposed hooks as an additional impaling means for the lure.

The invention further contemplates a lure having normally concealed hooks that are held by trigger mechanism and whereby the hooks in their concealed position will prevent accidental hooking engagement with the hands or person of the user and at such times as the lure is engaged by the mouth of a fish to release the hooks so that they project both rearwardly and laterally of the lure.

Novel features of construction and operation of the device will be more clearly apparent during the course of the following description, reference being had to the accompanying drawings wherein like characters of reference are employed to denote like parts throughout the several figures.

Figure 1:
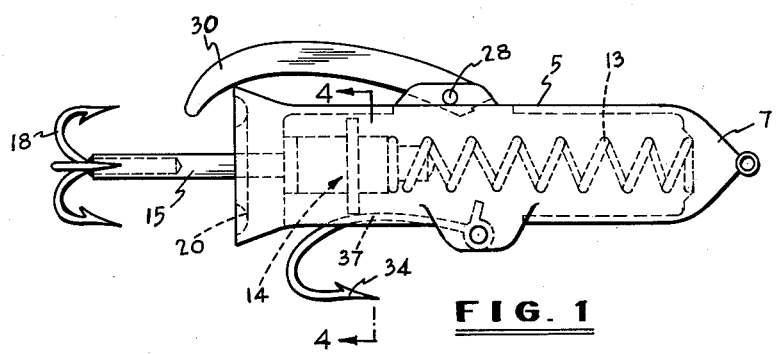
Figure 3:
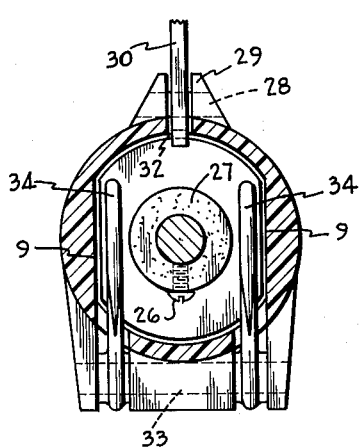
Figure 4:
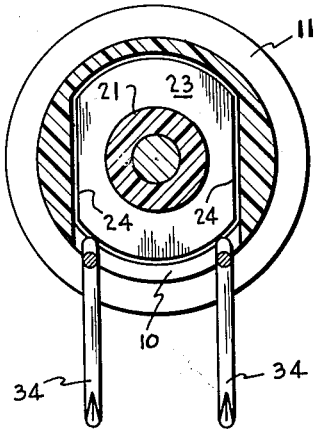

In the drawings:

FIGURE 1 is a side elevation of a lure constructed in accordance with the invention and with the hook devices being projected to an operative position, FIGURE 2 is a central vertical longitudinal section through the lure, parts in elevation and with the hooks in the retracted or recessed position, FIGURE 3 is a transverse section taken substantially on line 3—3 of FIGURE 2 and, FIGURE 4 is a transverse section taken substantially on line 4—4 of FIGURE 1.

Referring specifically to the drawings, there has been illustrated a preferably molded body portion 5 of cylindrical shape and with the body portion being formed hollow throughout its major length, forming a chamber 6. The forward end of the lure is closed by a tapered end portion 7, carrying a line attaching eye 8. The chamber 6 has flat side walls 9 and the lower wall is slotted at 10, for a purpose to be presently described. The rear end of the body portion 5 is outwardly flaring, as at 11 and the rear end portion is closed by a wall portion 12.

Shiftable in the chamber 6, under the influence of a coil spring 13, is a plunger mechanism illustrated as a whole by the numeral 14. The plunger mechanism embodies a shaft 15 that is axially disposed with respect to the body 5. The shaft 15 has a sliding bearing in a threaded nut 16 that is threaded into an opening 17 formed in the rear end wall 12. The shaft 15 projects rearwardly beyond the nut 16 and has secured thereto in any desirable manner hook devices 18, preferably four in number. In the retracted position, the points of the barbs 19 have seating engagement within a circumferential groove 20 that is formed in the end wall 12 and whereby the barbs are recessed to prevent accidental hooking engagement with objects during the time that the lure is not in use. The shaft 15 at its forward end is provided with a collar 21 that is held against displacement from the shaft by a screw 22. The collar 21 is reduced in diameter at its forward end to receive the end convolutions of the spring 13. Also disposed upon the shaft 15 is an actuating plate 23. The plate 23 may be composed of plastic or other non-corrosive material and it has upper and lower arcuate portions that conform to the curvature of the upper and lower radius of the chamber 6. The opposite edges of the plate 23 are formed straight and parallel as at 24 and the edges 24 are co-extensive with the flat side walls 9 of the chamber 6 whereby the plate is guided through the chamber 6 against rotation upon the shaft 15. The plate 23 is held against the collar 21 by a sleeve 25, that is held in fixed relation to the shaft 15 by a set screw 26. Disposed against the forward end of the sleeve 25 and frictionally held by the shaft 15 is a preferably rubber bumper ring 27.

Pivotally connected at 28, upon a pair of preferably integral ears 29 formed upon the body 5, is a trigger arm 30. The arm 30 may be composed of plastic or other non-corrosive material and it overlies the body 5 and is notched at 31 upon its inner end to have latching engagement with the upper marginal edge portion of the plate 23. The trigger extends downwardly into the lure through a slot 32.

Fixed upon a cross shaft 33 is a pair of spaced apart barbed hooks 34. The hooks 34 are spaced apart a distance capable of being disposed upon opposite sides of the shaft 15 and the sleeve 25 so that the hooks 34 may be recessed into the chamber 6 when the device is in the set position to be engaged by a fish. The shaft 33 is rotatably journaled in bearing members 35, preferably molded integral with the lure. Each of the hooks 34 at their point of engagement with the shaft 33 are provided with right angle tail extensions 36. The tail extensions 36 extend upwardly into the chamber 6 and in the line of movement of the plate 23 when the plunger is to be set against the tension of the spring 13 and whereby the hooks 34 are forced upwardly into the chamber 6. In the set position, the shank portions 37 of the hooks 34 are disposed in the line of movement of the plate 23 so that, when the plunger is activated to a release position to project the gang hooks 18, the plate will cam upon the shanks 37 and force the hooks downwardly through the slot 10 to be disposed outwardly of the body of the lure. The lure 5 is preferably formed of suitable plastics and may be molded or otherwise formed.

In the use of the device, when the lure is to be set for fishing, the operator forces the gang hooks 18 and the shaft 15 inwardly against the tension of the spring 13 until the plate 23 has assumed a latching engagement with the notch 31 of the trigger arm 30. In the set position as indicated in FIGURE 2, the plate 23 has engaged the tail portions 36 of the hooks 34, rocking the hooks 34 upwardly to be recessed into the chamber 6. In the full latching position, the barbs 19 of the hooks 18 are seated within the groove 20, thus presenting a lure that is free from all obstructions or elements that might be accidentally caught into the clothing or hands of the operator or that will prevent the lure from catching into weeds or other sub-surface obstructions. When a fish strikes the lure, its mouth engages over the body of the lure, compressing the trigger arm 30 and releasing the plate 23 at which time, the spring 13 biases the shaft 15 forwardly and shifts the plate and associated elements forwardly, causing the lower portion of the plate 23 to cam upon the shank portions 37 of the hooks 34, forcing the hooks downwardly and outwardly as clearly illustrated in FIGURE 1. The action under the influence of the spring 13 is sudden and the projection of the shaft 15 forces the gang hooks 18 into the throat portion of the fish, while the hooks 34 engage the mouth of the fish to prevent its escape. In the release position as viewed in FIGURE 1, the hooks 34 are positively held in their outward projected position by the overriding movement of the plate 23 thus assuring, that the fish will be positively impaled upon the lure. After the fish has been removed from hooks 18 and 34, the device is again reset by merely engaging the gang hooks and shoving the shaft and associated parts inwardly against the tension of the spring 13 to the point where the notch 31 will latch upon the upper edge of the plate 23.

It will be apparent from the foregoing that a very novel arrangement of hook devices has been provided for fishing lures that protect the lure against catching upon weeds or other objects during trolling motions and when released by the biting of the fish upon the lure and the trigger arm 30, the fish will be positively impaled by the hooks 18 and held against escape from the hooks 18 by the hooks 34. The shank portions 37 of the hooks 34 are preferably welded or otherwise fixedly connected to the shaft 33 so that they will operate in unison. As the plunger mechanism is reset, the plate bears against the tail portion 36 of the shank 37 forcing the hooks 34 upwardly into recessed position within the chamber 6. The device is simple in construction, is strong, durable, cheap to manufacture and is most effective as a fishing lure that may be successfully trolled beneath the surface of the water without danger of catching in weeds or other objects and also in the set position prevents accidental damage to the user or other equipment normally carried in the usual fishing kit.

It is to be understood that the invention is not limited to the precise construction shown, but that changes are contemplated as readily fall within the spirit of the invention as shall be determined by the scope of the subjoined claim.

Having described my invention, what I claim as new and desire to secure by Letters Patent is:

An artificial lure of the character described that comprises an elongated molded cylindrical body portion that is chambered for its major length, the chamber having a forward closed end wall and a rear closure wall that is provided with a relatively large threaded aperture, a plug threaded into the aperture to be flush with the inner and outer faces of the wall, the forward end of the lure being provided with a line attaching eye, a plunger movable axially of the chamber, the plunger being biased to an operative position by a compressible coil spring, the plunger having a shaft that is axially arranged with respect to the lure and that extends through a guide opening formed in the plug to extend outwardly of the lure for attachment to a plurality of spaced apart hook devices, the opposite side walls of the chamber being formed flat, a pair of collars fixed upon the inner end of the shaft, an actuating flat plate that is clamped between the collars, the opposite edges of the plate being formed straight and parallel for traverse engagement with the flat side walls of the chamber whereby to prevent rotation of the plate and the plunger with respect to the lure, a trigger device that comprises an elongated flat arcuately formed arm that is pivotally connected to the lure intermediate its length and with its major portion overlying the body of the lure and extending rearwardly to be disposed in a position to receive the mouth of a fish, the inner end of the arm being notched, the inner end of the arm extending through a slot formed in the upper side of the lure whereby the notch will have latching engagement with the plate and maintaining the plate and the plunger in a set position against the tension of the spring, a transverse shaft on the bottom portion of the lure and with the shaft being journaled at its ends in the body for rotation, a pair of auxiliary hook devices that are fixed upon the transverse shaft and that are adopted to move into and out of the chamber, the lure upon its bottom wall being slotted for the lateral movement of the last named hooks, the last named hooks being parallel with respect to each other, the hooks adapted to be moved in unison to and from a recessed position within the lure, shank portions of the last named hooks when in a recessed position being disposed in the path of the movement of the plate whereby the rearward movement of the plunger and the plate cams the last named hooks laterally outwardly from the body of the lure, the second named hooks when in recessed position being disposed upon opposite sides of the plunger, each of the last named hooks adjacent their points of connection with the transverse shaft having tail extensions that are disposed in the path of movement of the plate when the plunger is to be set against the tension of the spring and whereby the plate causes the last named hooks to be swung upwardly to recess position within the lure, a shock absorbing bumper carried by the plunger for engagement with the rear closure wall when the lure is actuated to project the plunger and its associated hooks, the rear closure wall upon its outer side having an annular groove for the reception of the pointed ends of the barbs of the first named hooks when the plunger is fully shifted to a latch position with respect to the arm and against the tension of the spring.

References Cited in the file of this patent

UNITED STATES PATENTS

| | | |
|---|---|---|
| 1,204,538 | Belding | Nov. 14, 1916 |
| 1,383,474 | Lucas | July 5, 1921 |
| 2,436,232 | Shetka | Feb. 17, 1948 |
| 2,517,844 | Cooney | Aug. 8, 1950 |
| 2,521,555 | Widmer | Sept. 5, 1950 |
| 2,596,201 | Bocchino | May 13, 1952 |
| 2,722,764 | Juhrend | Nov. 8, 1955 |

FOREIGN PATENTS

| | | |
|---|---|---|
| 1,008,488 | France | Feb. 20, 1952 |
| 439,265 | Italy | Sept. 14, 1948 |